VECTORSCOPE APPARATUS FOR ANALYSIS OF COLOR TELEVISION SIGNALS

Filed Jan. 18, 1963 2 Sheets-Sheet 1

Jnventor:
Helmut Schönfelder
by Michael Striker
Attorney

Jnventor:
Helmut Schönfelder
by Michael Striker
Attorney

United States Patent Office 3,230,304
Patented Jan. 18, 1966

3,230,304

VECTORSCOPE APPARATUS FOR ANALYSIS OF COLOR TELEVISION SIGNALS

Helmut Schönfelder, Darmstadt, Germany, assignor to Fernseh G.m.b.H., Darmstadt, Germany
Filed Jan. 18, 1963, Ser. No. 252,367
Claims priority, application Germany, Jan. 27, 1962, F 35,872
7 Claims. (Cl. 178—5.4)

This invention relates to vectorscope apparatus for examining colour television signals of the NTSC type. More specifically, the present invention is concerned with a vectorscope apparatus comprising two synchronous demodulators and a cathode ray tube. A colour television signal to be examined is applied to each of said two synchronous demodulators, to which are also applied unmodulated oscillations of the sub-carrier frequency which are mutually different in phase by 90°. The output signals from said two synchronous demodulators are then applied to control the deflection, in two coordinate directions of the electron beam of said cathode ray tube, yielding on its screen a polar display representing the colour television signal.

A known apparatus for the simultaneous examination of two colour television signals comprises an electronic switch, a cathode ray tube and two synchronous demodulators. The two colour television signals are applied in rapid alternation to said cathode ray tube showing said signals in effective superposition owing to the phenomenon of persistence of vision. For example, an NTSC signal may be applied to the synchronous demodulators on the one hand directly and on the other hand by way of an apparatus of which the characteristics are to be tested. Since in such a case the second signal is delayed by an appreciable amount in its passage through the apparatus under test, the two displays corresponding to the two colour signals are rotated with respect to one another by a certain angle which represents the amount of the delay. The displays becomes more difficult to compare as the delay which is introduced by the apparatus under test becomes greater. It is an object of the present invention, to overcome this difficulty.

It is a further object of the present invention to provide a new vectorscope apparatus showing the two displays corresponding to the two colour signals one directly over the other.

Another object of the present invention is that of providing an arrangement showing clearly all non-linearities (differential amplitude and phase distortions) of colour television signals.

It is still another object of the present invention to provide a method for testing any kind of networks and especially of television studio equipment.

According to the present invention there is provided vectorscope apparatus for producing in apparent simultaneity on the screen of a cathode ray tube displays representative of a plurality of differently delayed colour television signals each composed of components modulated upon a sub-carrier oscillation, comprising means for applying said signals in cyclic succession to two synchronous demodulators which are arranged to be fed also with unmodulated sub-carrier frequency oscillations mutually displaced in phase by 90° and of which the outputs are respectively applied to control the deflection in two coordinate directions of the electron beam in said cathode ray tube and comprising also means for causing the phases of said unmodulated sub-carrier oscillations to vary alike in the same said cyclic succession in such a manner as to yield on the screen of said cathode ray tube superimposed displays having the same intrinsic angular position.

The vectorscope apparatus provided in accordance with the present invention has the advantage that the displays shown by the vectorscope are traced one directly over the other, so that differential amplitude and phase distortions which may possibly be introduced by the apparatus to be tested can clearly be recognized. The phase-shifting of the sub-carrier frequency oscillations applied to the synchronous demodulators may be effected by means of a relatively simple and inexpensive phase shifter, since only a single frequency need to be shifted in phase, instead of a wide-band signal as in known apparatus.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

In all the figures, corresponding elements are designated by the same reference symbols.

Figure 1:
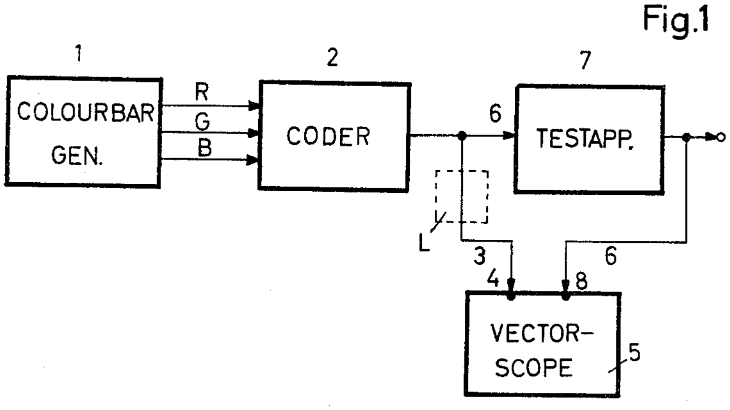
FIGURE 1 is a block schematic diagram illustrating a known assembly of vectorscope apparatus.
Figure 3:
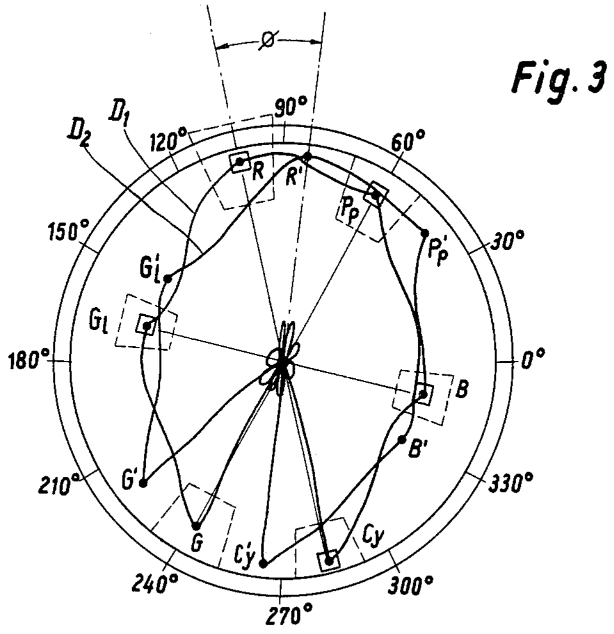
FIGURE 3 is a diagram representing a display such as is produced on the screen of the vectorscope employed in the apparatus described in relation to FIGURE 1.

In the known apparatus illustrated by FIGURE 1 a colourbar signal generator 1 produces separate signals for red (R), green (G) and blue (B) which are applied to an NTSC coder 2, the composite output signal from which is applied on the one hand by way of a channel 3 to one input terminal 4 of a vectorscope 5 and on the other hand by way of a channel 6 to an apparatus 7 to be tested. This apparatus may be either a single circuit or any combination of circuits such as the whole system of apparatus constituting a television studio chain. The output signal from apparatus 7 passes by way of channel 6 to the second input terminal 8 of vectorscope 5. The colour television signal transmitted through apparatus 7 is delayed by that apparatus, so that as shown in FIGURE 3 the two displays $D_1$ and $D_2$ corresponding to the delayed and undelayed signals are rotated one with respect to the other through an angle $\phi$ determined by the signal delay. In the displays depicted by FIGURE 3 the points corresponding to the different colours in the signal transmitted to the vectorscope by way of channel 3 are indicated by letters, as follows:

Red (R), purple (P*p*), blue (B), cyan (C*y*), green (G) and yellow (G*l*). The points R′, P*p*′, C*y*′, G′, G*l*′, differentiated by the addition of a prime, relate to the same colours in the signal transmitted by way of channel 6 which includes the apparatus under test.

Agreement in phase of the two displays may be produced, for example, by including in channel 3 a delay circuit, shown in broken lines at L, such as to compensate for the delay introduced in apparatus 7. Such a delay circuit would, however, require an uncommonly large expense on circuit elements.

Figure 2:
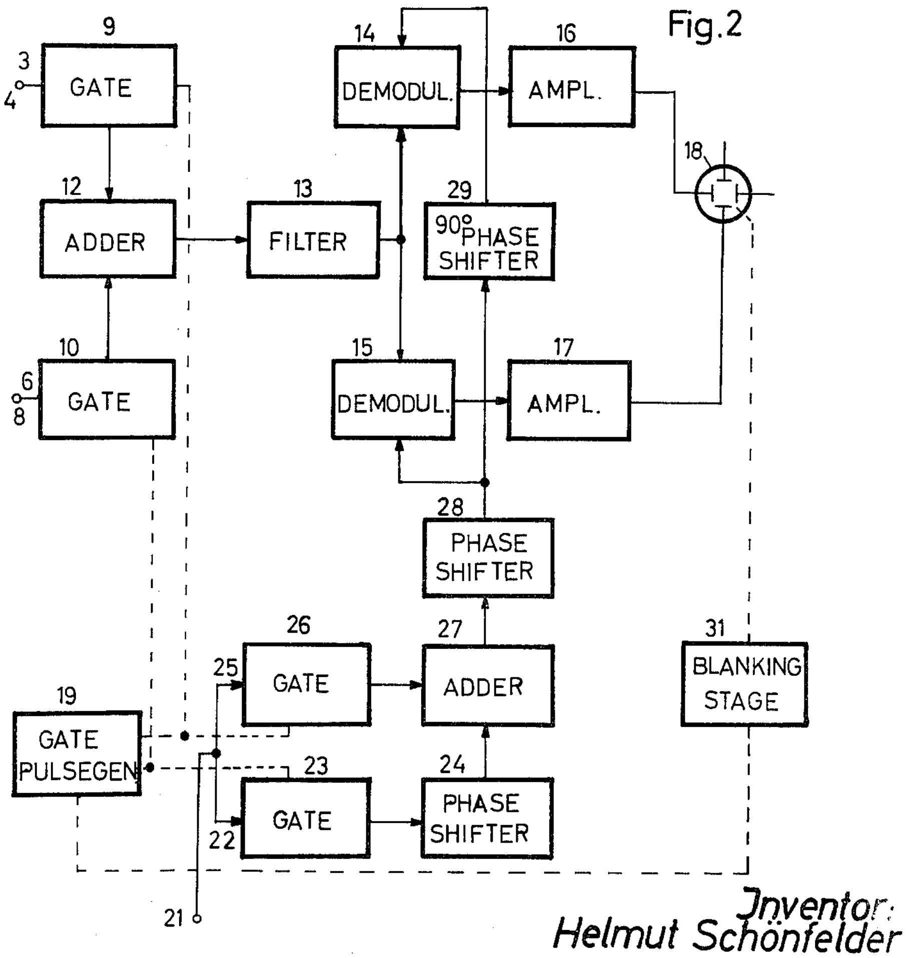
FIGURE 2 is a block schematic diagram illustrating one embodiment of vectorscope apparatus according to the present invention.

In the apparatus according to the present invention which is illustrated by FIGURE 2, a plurality, in this case two, of colour signals are applied by way of respective input terminals 4 and 8 to separate gate circuits 9 and 10, the output signals from which are combined in an adder circuit 12 and fed by way of the band-pass filter 13 to two synchronous demodulators 14 and 15.

The output signals from these demodulators are applied via the amplifiers 16, 17 respectiively to the deflector electrodes of a cathode ray tube 18 which provides the vectorscope display. Gates 9 and 10 are opened in cyclic succession, that is alternatively, under the control of a gate-pulse generator 19, so that the two colour signals applied to the input terminals 4, 8 are made visible in apparent simultaneity upon the screen of cathode ray tube 18. An unmodulated oscillation of sub-carrier frequency which is received from a conventional oscillator by way of an input terminal 21, is applied on the one hand by way of a signal channel 22, a gate circuit 23 and a phase shifter 24 to one input terminal of an adding stage 27, and on the other hand is applied by way of a signal channel 25 and a gate circuit 26 to the other input terminal of adding stage 27. The output signal from adding stage 27 is applied by way of a further phase-shifter 28 on the one hand to synchronous demodulator 15 and on the other hand by way of a stage 29, which effects a phase shift of 90°, to synchronous demodulator 14. It will in many cases be convenient for the oscillation of sub-carrier frequency which is applied to input terminal 21 to be derived from the "colour burst" of one of the two NTSC colour signals.

Gate-pulse generator 19, the repetition rate of which may be some 200 kc./s., is connected on the one hand to gates 9 and 26, while its other output, pulsed alternately with the first, is connected to gates 10 and 23. Gates 26 and 23 thus open in the same cyclic succession as gates 9 and 10. In this manner, whenever that colour television signal which is delayed in its passage through the apparatus on test is applied from input terminal 8 to the adder stage 12 by way of gate 10, then gate 23 is also opened to allow the sub-carrier frequency oscillation to pass by way of channel 22 and phase-shifter 24 to adding stage 27. The sub-carrier oscillation is thus delayed in phase-shifter 24, the phase -shift of which is adjustable, by an amount such that the phase difference between the two sub-carrier oscillations fed through channels 22 and 25 is equal to the phase difference between the sub-carrier components of the colour television signals passing through channels 3 and 6. Phase shifter 28 may be employed to adjust as necessary the general phasing of the two sub-carrier oscillations.

It will in many cases be advantageous for a pulse developed in gate-pulse generator 19 to be fed to the cathode ray tube by way of a blanking stage 31, so that the electron beam of the cathode-ray tube is suppressed during each change-over from one signal to the other.

Figure 4:
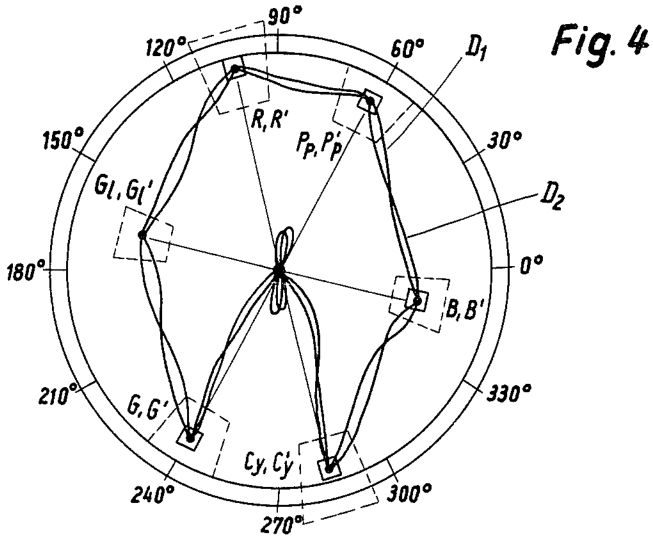
FIGURE 4 is a diagram representing a display such as is produced on the screen of the cathode ray tube in vectorscope apparatus in accordance with the present invention as described in relation to FIGURE 2.

FIGURE 4 shows in addition to the display $D_1$ of the undelayed signal the display $D_2$ produced by the delayed signals. The points corresponding to the colours red (R), purple (P*p*), blue (B), cyan (C*y*), green (G) and yellow (G*l*) now coincide. In this manner the characteristics of the apparatus 7 and in particular the differential amplitude and phase distortions arising in this apparatus may readily be evaluated.

While the invention has been illustrated and described as embodied in vectorscope apparatus for examining colour television signals of the NTSC type it is not intended to be limited to the details shown, since various modifications and structural changes may be made without departing in any way from the spirit of the present invention.

What is claimed as new and desired to be secured by Letters Patent is:

1. Vectorscope apparatus for producing in apparent simultaneity on the screen of a cathode ray tube displays representative of a plurality of differently delayed television signals each composed of components modulated upon a sub-carrier oscillation, comprising, in combination, two synchronous demodulators each having one first input lead, one second input lead and one output lead the output signal of one of said demodulators controlling the deflection in the other of the two coordinate tions of the electron beam in said cathode ray tube and the output signal of the other of said demodulators controlling the deflection in the other of the two cordinate directions of the electron beam in said cathode ray tube; a set of gating means each having an input lead, said gating means passing a plurality of signals applied to their input leads in cyclic succession to one output lead; connection means applying said television signals to said input leads of said set of gating means; connection means connecting said output lead of said set of gating means with both said first input leads of said two synchronous demodulators; means for applying unmodulated sub-carrier frequency oscillations mutually displaced in phase by 90° to the second input lead of said synchronous demodulators; and means for causing the phases of said unmodulated sub-carrier frequency oscillations to vary alike in the same cyclic succession thereby to produce on the screen of said cathode ray tube superimposed displays having the same intrinsic angular position.

2. Vectorscope apparatus as claimed in claim 1, wherein said means for applying unmodulated sub-carrier frequency oscillations to said demodulators comprises a second set of gating means having one input lead and one output lead; connection means applying the unmodulated sub-carrier oscillation to the input lead of each of said second set of gating means; delay means; a signal path connecting said output lead of one of said second set of gating means directly with a common point; another signal path connecting said output lead of the other of said second set of gating means via said delay means with said common point; a phase shifter producing a phase shift of 90°; connection means connecting said common point with the second input leads of one of said synchronous demodulators; and further connection means connecting said common point via said phase shifter with the second input lead of the other of said synchronous demodulators.

3. Vectorscope apparatus for producing in apparent simultaneity on the screen of a cathode ray tube displays representative of a plurality of differently delayed colour television signals each composed of components modulated upon a sub-carrier oscillation, comprising, in combination, two synchronous demodulators each having one first input lead, one second input lead and one output lead, the output signal of one of said demodulators controlling the deflection in one of the two coordinate directions of the electron beam in said cathode ray tube and the output signal of the other of said demodulators controlling the deflection in the other of the two coordinate directions of the electron beam in said cathode ray tube; a first set of signal gating means operable to allow said television signals to pass in cyclic succession from respective input terminals to said first input leads of said synchronous demodulators; delay means; a plurality of alternatively operative signal paths including said delay means; means for applying unmodulated sub-carrier frequency oscillations to the inputs of said signal paths; connection means connecting said signal paths with a common point; means for applying said unmodulated sub-carrier frequency oscillations from said common point directly to the second input lead of one of said demodulators and for applying said subcarrier frequency oscillations from said common point shifted in phase 90° to the second input lead of the other of said demodulators; and a second set of signal gating means each operable synchronously with a gating means of said first set of gating means to allow the passage of said unmodulated oscillations of subcarrier frequency through that one of said signal paths which contains said delay means producing a delay appropriate to that signal passed by said gating means of said first set.

4. Vectorscope apparatus as claimed in claim 3, further comprising means for suppressing the electron beam of said cathode ray tube during each transition from one to another of said colour television signals.

5. A method for producing a vectorscope indication in apparent simultaneity on a screen of a cathode ray tube displays representative of a plurality of differently delayed television signals each composed of components modulated on a sub-carrier oscillation, comprising the steps of synchronously demodulating television signals in cyclic succession in synchronized demodulating means; supplying to said synchronized demodulating means a first unmodulated sub-carrier frequency oscillation; supplying to said synchronized demodulating means synchronously with the supplying of said first unmodulated sub-carrier frequency oscillation a second unmodulated sub-carrier frequency oscillation displaced 90° in phase from said first unmodulated sub-carrier frequency oscillation; delaying the deflection in two coordinate directions of the electron beam of a cathode ray tube by the demodulated signals; and similarly varying in the same cyclic succession as the demodulated signals the phases of the unmodulated sub-frequency oscillation prior to supplying said oscillations to said synchronized demodulating means thereby to produce on the screen of the cathode ray tube superimposed displays having the same intrinsic angular position.

6. A method for producing a vectorscope indication in apparent simultaneity on a screen of a cathode ray tube displays representative of a plurality of differently delayed television signals each composed of components modulated on a sub-carrier oscillation, comprising the steps of synchronously demodulating television signals in cyclic succession in synchronized demodulating means; alternately directing unmodulated sub-carrier frequency oscillations through independent signal paths to a common point; supplying to said synchronized demodulating means a first unmodulated sub-carrier frequency oscillation present at said common point; phase shifting by 90° a second unmodulated sub-carrier frequency oscillation present at said common point; supplying to said synchronized demodulating means synchronously with the supplying of said first unmodulated sub-carrier frequency oscillation the phase shifted second unmodulated sub-carrier frequency oscillation; delaying the deflection in two coordinate directions of the electron beam of a cathod ray tube by the demodulated signals; and similarly varying in the same cyclic succession as the demodulated signals the phases of the unmodulated sub-frequency oscillations prior to supplying said oscillations to said synchronized demodulating means thereby to produce on the screen of the cathode ray tube superimposed displays having the same intrinsic angular position.

7. A method for projecting a vectorscope indication in apparent simultaneity on a screen of a cathode ray tube displays representative of a plurality of differently delayed television signals each composed of components modulated on a sub-carrier oscillation, comprising the steps of synchronously demodulating television signals in cyclic succession in synchronized demodulating means; directing unmodulated sub-carrier frequency oscillations through independent signal paths to a common point; alternately independently gating said unmodulated sub-carrier oscillations through said independent signal paths; supplying to said synchronized demodulating means a first unmodulated sub-carrier frequency oscillation present at said common point; phase shifting by 90° a second unmodulated sub-carrier frequency oscillation present at said common point; supplying to said synchronized demodulating means synchronously with the supplying of said first unmodulated sub-carrier frequency oscillation the phase shifted second unmodulated sub-carrier frequency oscillation; delaying the deflection in two coordinate directions of the electron beam of a cathode ray tube by the demodulated signals; and similarly varying in the same cycle succession as the demodulated signals the phases of the unmodulated sub-frequency oscillations prior to supplying said oscillations to said synchronized demodulating means thereby to produce on the screen of the cathode ray tube superimposed displays having the same intrinsic angular position.

References Cited by the Examiner

UNITED STATES PATENTS

| | | | |
|---|---|---|---|
| 2,751,554 | 6/1956 | Schlesinger | 324—88 |
| 2,751,429 | 6/1956 | Schlesinger | 178—6 |
| 2,951,114 | 8/1960 | Good | 178—6 |

DAVID G. REDINBAUGH, *Primary Examiner.*

JOHN A. O'BRIEN, *Assistant Examiner.*